(12) United States Patent
Jeong

(10) Patent No.: US 11,486,659 B2
(45) Date of Patent: Nov. 1, 2022

(54) COOLING DEVICE, COOLING SYSTEM, AND CONTROL METHOD OF COOLING SYSTEM

(71) Applicants: Hyundai Motor Company, Seoul (KR); Kia Motors Corporation, Seoul (KR)

(72) Inventor: Seong Bin Jeong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 357 days.

(21) Appl. No.: 16/750,297

(22) Filed: Jan. 23, 2020

(65) Prior Publication Data
US 2021/0102762 A1 Apr. 8, 2021

(30) Foreign Application Priority Data
Oct. 8, 2019 (KR) .......................... 10-2019-0124722

(51) Int. Cl.
| | |
|---|---|
| *F28F 9/02* | (2006.01) |
| *F25B 39/04* | (2006.01) |
| *F24F 11/83* | (2018.01) |
| *F25B 41/00* | (2021.01) |

(52) U.S. Cl.
CPC ............ *F28F 9/0263* (2013.01); *F24F 11/83* (2018.01); *F25B 39/04* (2013.01); *F25B 41/00* (2013.01); *F25B 2339/0444* (2013.01); *F25B 2400/23* (2013.01)

(58) Field of Classification Search
CPC .............. F25B 43/00; F25B 2400/0403; F25B 2339/04; F25B 2500/14; B60H 1/3227; B60H 1/32281; B60H 1/00278; B60H 1/00771; B60H 1/143; B60H 1/00885; B60H 1/00899; B60H 1/00764; B60H 2001/00928; F24F 2140/50; B01D 17/0211; B01D 17/0214
See application file for complete search history.

(56) References Cited

U.S. PATENT DOCUMENTS

| | | | |
|---|---|---|---|
| 2005/0269062 A1 | 12/2005 | Guerrero et al. | |
| 2012/0024517 A1* | 2/2012 | Imanishi | B60H 1/32284 165/104.11 |
| 2013/0149119 A1 | 6/2013 | Seo | |
| 2018/0328626 A1* | 11/2018 | Moriyama | F25B 43/02 |

FOREIGN PATENT DOCUMENTS

| | | |
|---|---|---|
| JP | 4721705 B2 | 7/2011 |
| KR | 20130064913 A | 6/2013 |
| KR | 20190104739 A | 9/2019 |
| WO | 2004020927 A1 | 3/2004 |

* cited by examiner

*Primary Examiner* — Larry L Furdge
*Assistant Examiner* — Keith Stanley Myers
(74) *Attorney, Agent, or Firm* — Slater Matsil, LLP

(57) ABSTRACT

A cooling device includes a number of cooling tubes arranged in parallel such that a first cooling fluid and a second cooling fluid can flow in the cooling tubes. A tank communicates with the cooling tubes to allow the first cooling fluid or the second cooling fluid to flow through the cooling tubes. A diaphragm is located inside the tank to separate the tank into a first space allowing the first cooling fluid to flow therein and a second space allowing the second cooling fluid to flow therein. The diaphragm is coupled to the tank to be rectilinearly movable in a direction of an arrangement of the plurality of cooling tubes.

13 Claims, 12 Drawing Sheets

COOLING DEVICE, COOLING SYSTEM, AND CONTROL METHOD OF COOLING SYSTEM

CROSS-REFERENCE TO RELATED APPLICATIONS

This application claims priority to Korean Patent Application No. 10-2019-0124722, filed on Oct. 8, 2019, which application is hereby incorporated herein by reference.

TECHNICAL FIELD

The present invention relates a cooling device, a cooling system, and a control method of cooling system.

BACKGROUND

Generally, an electric vehicle tends to have a relatively short overhang as an engine is not mounted in the front part of a vehicle body corresponding to an engine room of a conventional vehicle equipped with an internal combustion engine.

Therefore, in order to mount a drive motor, a reducer, a cooling device, and the like on a shortened overhang, a new cooling device structure having a reduced thickness is required.

In particular, in the case of a cooling system of an internal combustion engine applied to a commercial vehicle, the cooling water cools the internal combustion engine by maintaining temperature thereof at a level of 110° C., while the motor components require a cooling water temperature of 65° C. Compared to the cooling devices used in engines, the cooling devices used in the motor components are relatively small in size and may smoothly realize cooling system performance.

Matters described as the background above are only for the purpose of facilitating the understanding of the background of the present invention and should not be taken as acknowledging that the matters correspond to the related art already known to those skilled in the art.

SUMMARY

Embodiments of the present invention relate to a structure and control method for varying heat exchange and preventing refrigerant or cooling water from flowing in by being mixed with each other. Particular embodiments of the present invention relate to a cooling device that may be used in a small electric vehicle and the like.

Embodiments of the present invention can address problems occurring in the related art and can provide a cooling device, a cooling system, and a control method of the cooling system that allow a vehicle such as a small electric vehicle having a short overhang body structure to maximize a size reduction and efficiency improvement by changing the structure of a condenser and a radiator of the cooling device mounted on an existing internal combustion engine vehicle, and by arranging the structure in parallel in a single row.

According to one aspect of the present invention, a cooling device includes a plurality of cooling tubes arranged in parallel, through which a first cooling fluid and a second cooling fluid flow. A pair of tanks communicate with the plurality of cooling tubes to allow the first cooling fluid or the second cooling fluid to flow through the plurality of cooling tubes. A diaphragm is located inside each of the tanks, separating the tank into a first space allowing the first cooling fluid to flow therein and a second space allowing the second cooling fluid to flow therein, and coupled to the tank to be rectilinearly movable in a direction of an arrangement of the plurality of cooling tubes.

The device may further include a guide extending in the direction of the arrangement of the plurality of cooling tubes and coupled by a screw to the diaphragm and an actuator configured to rotate the guide, thereby rectilinearly moving the diaphragm.

A diaphragm O-ring may be fastened to a gap between an outer surface of the diaphragm and an inner surface of the tank and a guide O-ring and a washer may be fastened to a gap between the diaphragm and the guide.

A thread in a form of a square screw or a toothed screw may be provided on each of the diaphragm and the guide.

A cooling system may further include an air conditioning circuit using a refrigerant as the first cooling fluid, connected to the first space to allow the first cooling fluid to flow therein, and provided with a cooling core for indoor air conditioning; and a cooling circuit using cooling water as the second cooling fluid, connected to the second space to allow the second cooling fluid to flow therein, and connected to an electrical component so as to allow the second cooling fluid to exchange heat with the electrical component.

A first gas-liquid separator configured to separate gas from a fluid discharged from the tank may be provided in the air conditioning circuit, and the gas separated in the first gas-liquid separator may be flowed again into the first space.

A cooling water separator configured to separate the cooling water from a fluid discharged from the tank using a difference in specific gravity may be provided in the air conditioning circuit, and the cooling water separator may be connected to the cooling circuit to allow the separated cooling water to return to the cooling circuit.

The refrigerant may have a higher specific gravity than the cooling water in a liquid state, a first cooling water discharge port, which is connected to the cooling circuit and through which the separated cooling water is discharged, may be located in the cooling water separator at a higher side in a gravity direction than a first refrigerant discharge port through which the refrigerant is discharged, and a first valve may be provided in the first cooling water discharge port, thereby allowing or blocking a flow of the cooling water.

The refrigerant may have a higher specific gravity than the cooling water in a liquid state, a first cooling water discharge port, which is connected to the cooling circuit and through which the separated cooling water is discharged, may be located in the cooling water separator at a higher side in a gravity direction than a first refrigerant discharge port through which the refrigerant is discharged, and a cooling water separation plate may be provided, the cooling water separation plate extending in a planar direction from the inside of the cooling water separator, located to be movable in a vertical direction, having a lower specific gravity than the refrigerant in a liquid state, having a higher specific gravity than the cooling water, and provided with through holes allowing a fluid movement between upper and lower sides.

The cooling water separation plate may block the first cooling water discharge port in a state of being maximally raised inside the cooling water separator.

A second gas-liquid separator configured to separate gas from a fluid discharged from the tank may be provided in the cooling circuit.

A refrigerant separator configured to separate the refrigerant in a liquid state using a difference in specific gravity in a state where the gas discharged from the second gas-liquid separator is cooled may be provided, and the refrigerant separator may be connected to the air conditioning circuit to allow the separated refrigerant to return to the air conditioning circuit.

A refrigerant separator configured to separate the refrigerant from a fluid discharged from the tank using a difference in specific gravity may be provided in the air conditioning circuit, and the refrigerant separator may be connected to the air conditioning circuit to allow the separated refrigerant to return to the air conditioning circuit, the refrigerant in a gas state may have a lower specific gravity than the cooling water and may have a higher specific gravity than air, a second refrigerant discharge port, which is connected to the air conditioning circuit and through which the cooling water is discharged, may be located in the refrigerant separator at a higher side in a gravity direction than a second cooling water discharge port through which the refrigerant is discharged, and a refrigerant separation plate may be provided, the refrigerant separation plate extending in a planar direction from the inside of the refrigerant separator, located to be movable in a vertical direction, having a lower specific gravity than the refrigerant in a gas state, having a higher specific gravity than air, and provided with through holes allowing a fluid movement between upper and lower sides.

The cooling water may flow inside the refrigerant separator so as to be maintained at a predetermined height, which is located on a lower side in the gravity direction than the second refrigerant discharge port, and the refrigerant separation plate may block the second refrigerant discharge port at a predetermined height.

A gas injection unit having gas stored therein may be provided on the refrigerant separation plate.

A flow restriction portion configured to restrict a flow direction of the fluid discharged from the tank may be provided inside the refrigerant separator.

A control method of the cooling system may include calculating a current air conditioning load of the air conditioning circuit and a current cooling load of the cooling circuit on the basis of a current driving state, calculating a ratio between the calculated current air conditioning load and the calculated current cooling load, and controlling a movement of the diaphragm on the basis of the calculated ratio between the current air conditioning load and the current cooling load.

The control method may further include calculating an estimated air conditioning load of the air conditioning circuit and an estimated cooling load of the cooling circuit, before the controlling the movement of the diaphragm, on the basis of an estimated driving state after a preset time or a preset distance using navigation information; and calculating a ratio between the calculated estimated air conditioning load and the calculated estimated cooling load, and controlling the movement of the diaphragm, in the controlling the movement of the diaphragm, on the basis of the ratio between the calculated current air conditioning load and the calculated current cooling load and a change in the ratio between the calculated estimated air conditioning load and the calculated estimated cooling load.

As described above, the present invention allows a vehicle such as a small electric vehicle having the short overhang body structure to maximize the size reduction and the efficiency improvement by changing the structure of the condenser and radiator of a cooling device mounted on an existing internal combustion engine vehicle and by arranging the structure in parallel in a single row.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF ILLUSTRATIVE EMBODIMENTS

Figure 1:
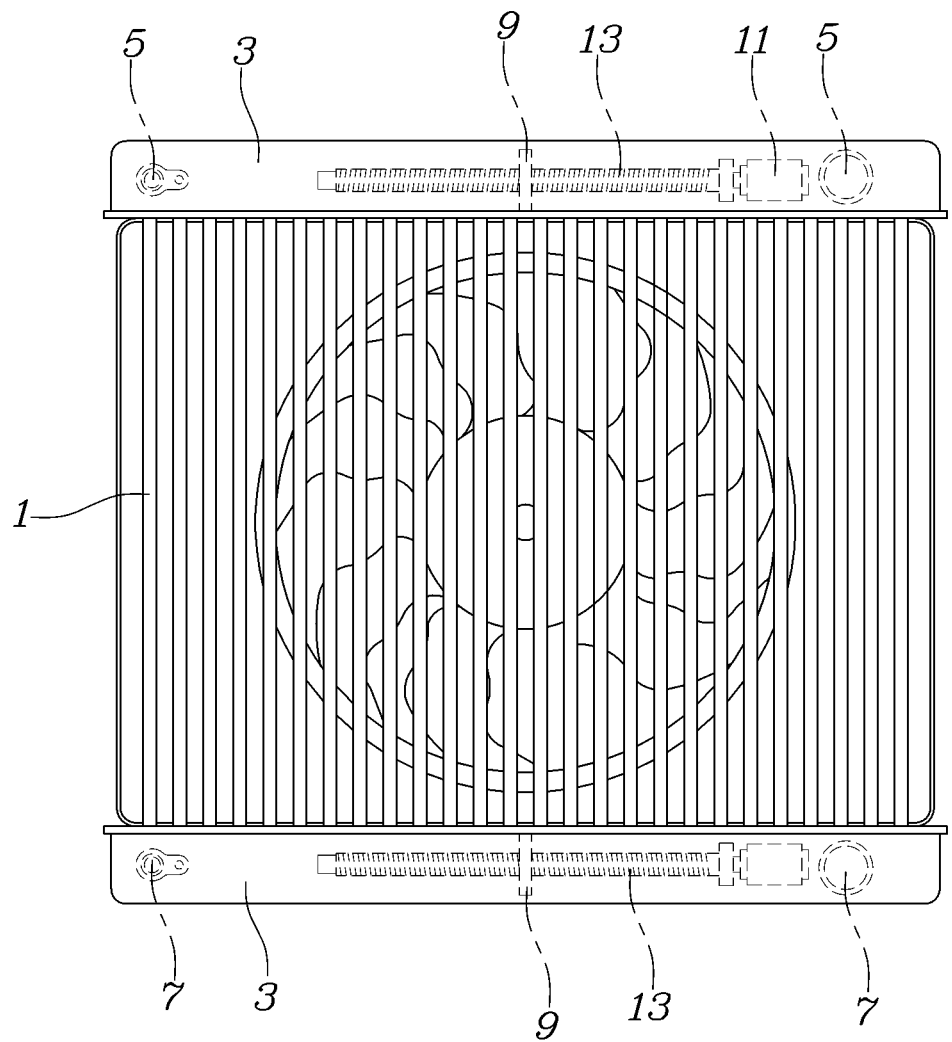
FIG. 1 is a view illustrating a cooling device according to the present invention.

Hereinbelow, exemplary embodiments of the present invention will be described in detail with reference to the accompanying drawings. Throughout the drawings, the same reference numerals will refer to the same or like parts.

With reference to FIG. 1, a cooling device according to an embodiment of the present invention is configured to include: a plurality of cooling tubes 1 arranged in parallel and having a first cooling fluid and a second cooling fluid flowing therein; a pair of tanks 3 communicating with the plurality of cooling tubes 1 to allow the first cooling fluid or the second cooling fluid to flow through the plurality of cooling tubes 1; and a diaphragm 9 located inside the tank 3, separating the tank 3 into a first space 36 allowing the first cooling fluid to flow therein and a second space 38 allowing the second cooling fluid to flow therein, and coupled to the tank 3 to be rectilinearly movable in a direction of an arrangement of the plurality of cooling tubes 1.

In the plurality of cooling tubes 1 of the structure of the cooling device, the first cooling fluid and the second cooling fluid flow, wherein the first cooling fluid may flow in some portion of the tubes, and the second cooling fluid may flow in the remaining portion of the tubes.

In addition, the plurality of cooling tubes 1 may be arranged side by side in parallel, in particular, may be arranged in parallel in one row, and may share a common cooling fan.

Accordingly, by reducing ventilation resistance in a single row parallel arrangement, the capacity and size of a fan motor of the heat exchanger may be reduced, and the rate of air flow and rate of heat flow may be increased when using a motor having a same capacity.

A condenser in which the first cooling fluid flows and a radiator in which the second cooling fluid flows are arranged in parallel in a row to form a combined heat exchanger, and one cooling fan is shared for the condenser and the radiator.

In addition, the first cooling fluid and the second cooling fluid flow through the condenser and the radiator using the same cooling tubes 1, and the pair of the same tanks 3 are provided on the top side and bottom side of the cooling tube 1. Accordingly, the first cooling fluid and the second cooling fluid flowing in from the upper tank 3 may flow to the lower tank 3.

In particular, the cooling tube 1 may extend in a vertical direction, the pair of the tanks 3 may be located on the top side and the bottom side, respectively, or may be located only on the top side or the bottom side.

The diaphragm 9 is provided inside each of the tank 3 to separate the first cooling fluid and the second cooling fluid, thereby preventing mixing thereof, and as the diaphragm 9 varies, the number of the cooling tubes 1 that communicate with the first space 36 and the second space 38, respectively, may be determined.

That is, in order to vary the diaphragm 9, a hole is provided in a center of the diaphragm 9 so that a guide 13 is coupled therewith, and a shaft 21 extending through the central axis of the guide 13 is further provided. In addition, an actuator 11 is provided on a head of the guide 13 so as to rectilinearly move the diaphragm 9 by rotating the guide 13. Accordingly, the guide 13 is rotated by a rotation of the actuator 11, whereby the diaphragm varies by a rectilinear motion.

In addition, a shaft holder 23 may be further provided to fix opposite ends of the shaft 21 so that the guide 13 is not shaken or separated while being rotated.

To describe the shape of the guide 13 in more detail, the guide 13 may be provided in a form of a square screw or a toothed screw, and the hole of the diaphragm 9 may also be provided in the form of a nut-shaped square screw or the toothed screw to couple with the guide 13.

Figure 2:
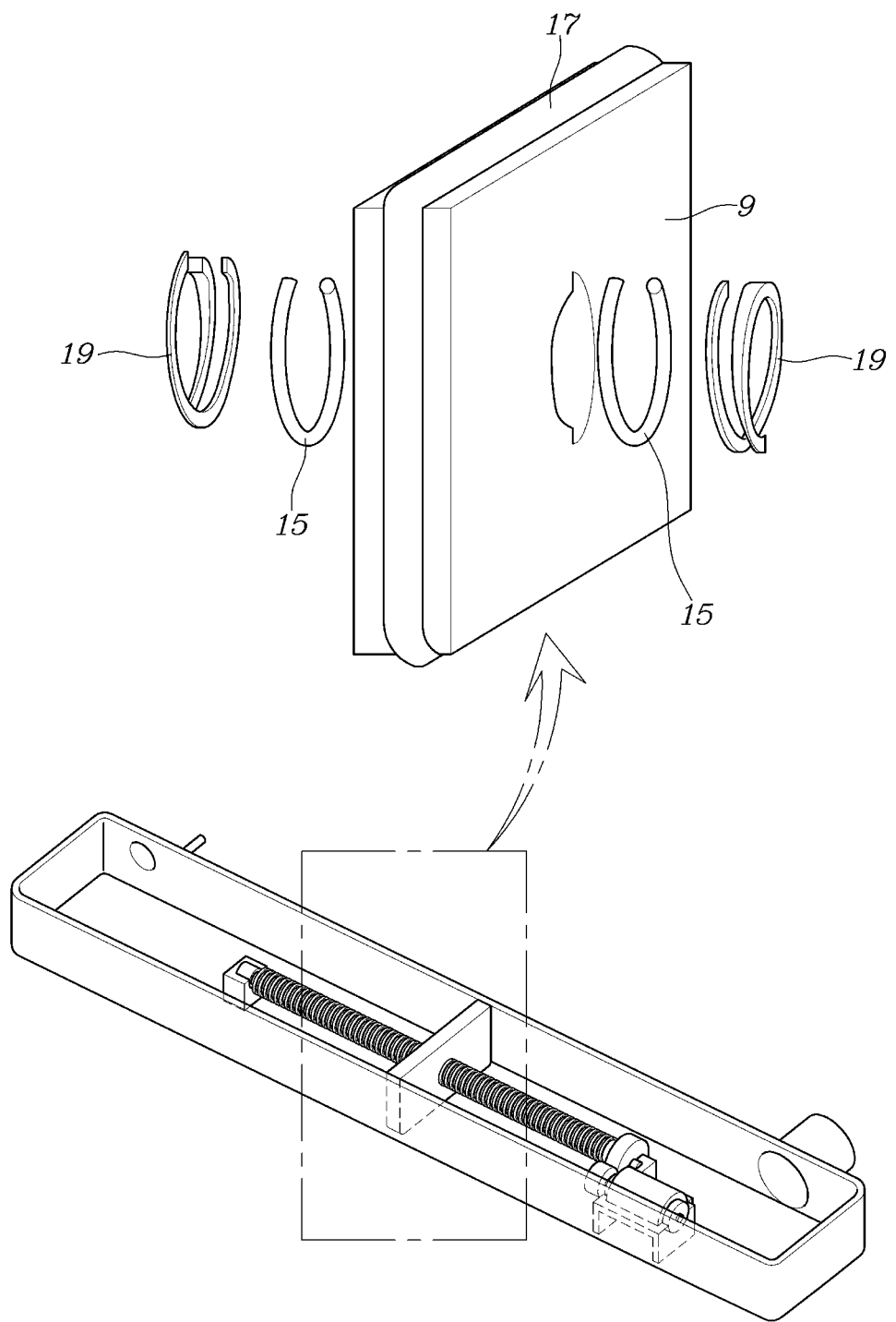
FIG. 2 is a view illustrating some of components coupled to a diaphragm of FIG. 1.
Figure 3:
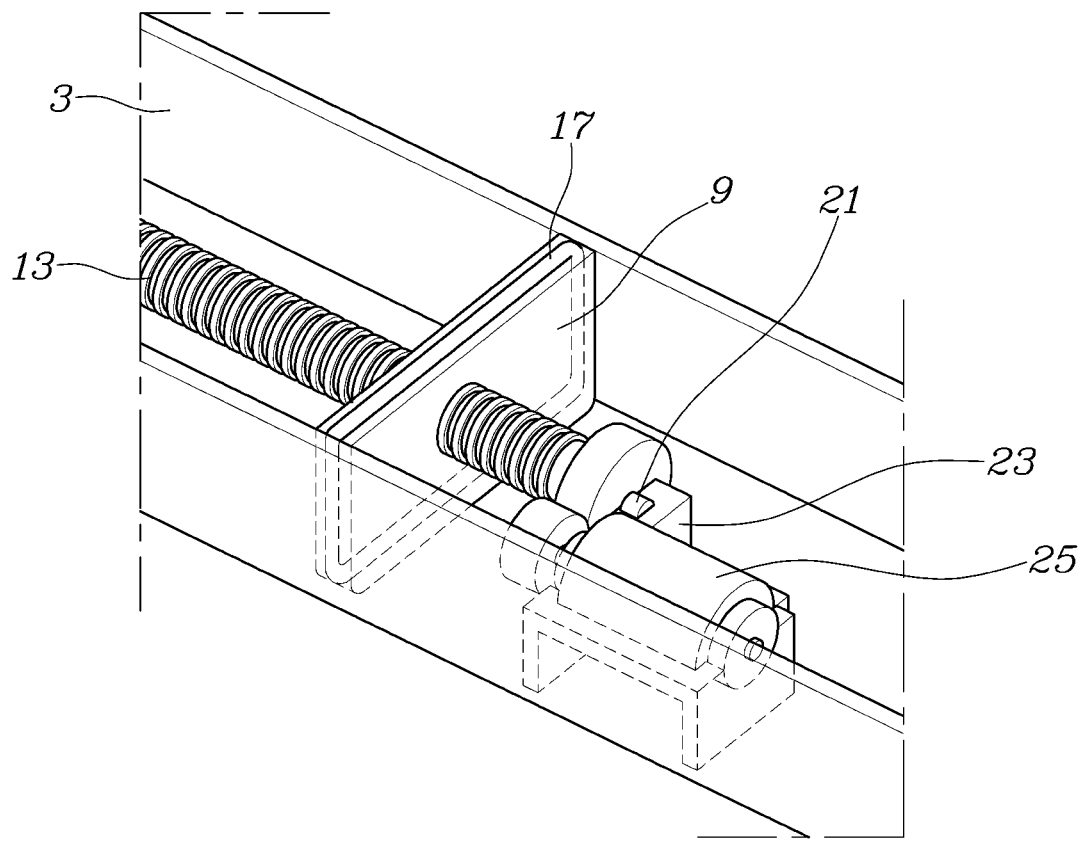
FIG. 3 is a view illustrating the components coupled to the diaphragm of FIG. 1.

As shown in FIG. 2, in order to prevent the first cooling fluid and the second cooling fluid from being mixed with each other as the diaphragm 9 varies by the rotational force of the guide 13 at the inside of the tank 3, a groove is formed on an outer surface of the diaphragm 9, that is, the outer surface being in contact with the tank 3, whereby a diaphragm O-ring 17 is fastened thereto. In addition, a pair of respective guide O-rings 15 and washers 19 are also further provided between the diaphragm 9 and the guide 13, whereby the diaphragm 9 and the guide 13 are fastened.

A cooling system including the cooling device is provided to further include: an air conditioning circuit 89 using a refrigerant 29 as the first cooling fluid, connected to the first space 36 to allow the first cooling fluid to flow therein, and provided with a cooling core 43 for indoor air conditioning; and a cooling circuit 91 using the cooling water 27 as the second cooling fluid, connected to the second space 38 to allow the second cooling fluid to flow therein, and connected to an electrical component 57 which exchanges heat with the cooling water 27.

Figure 4:
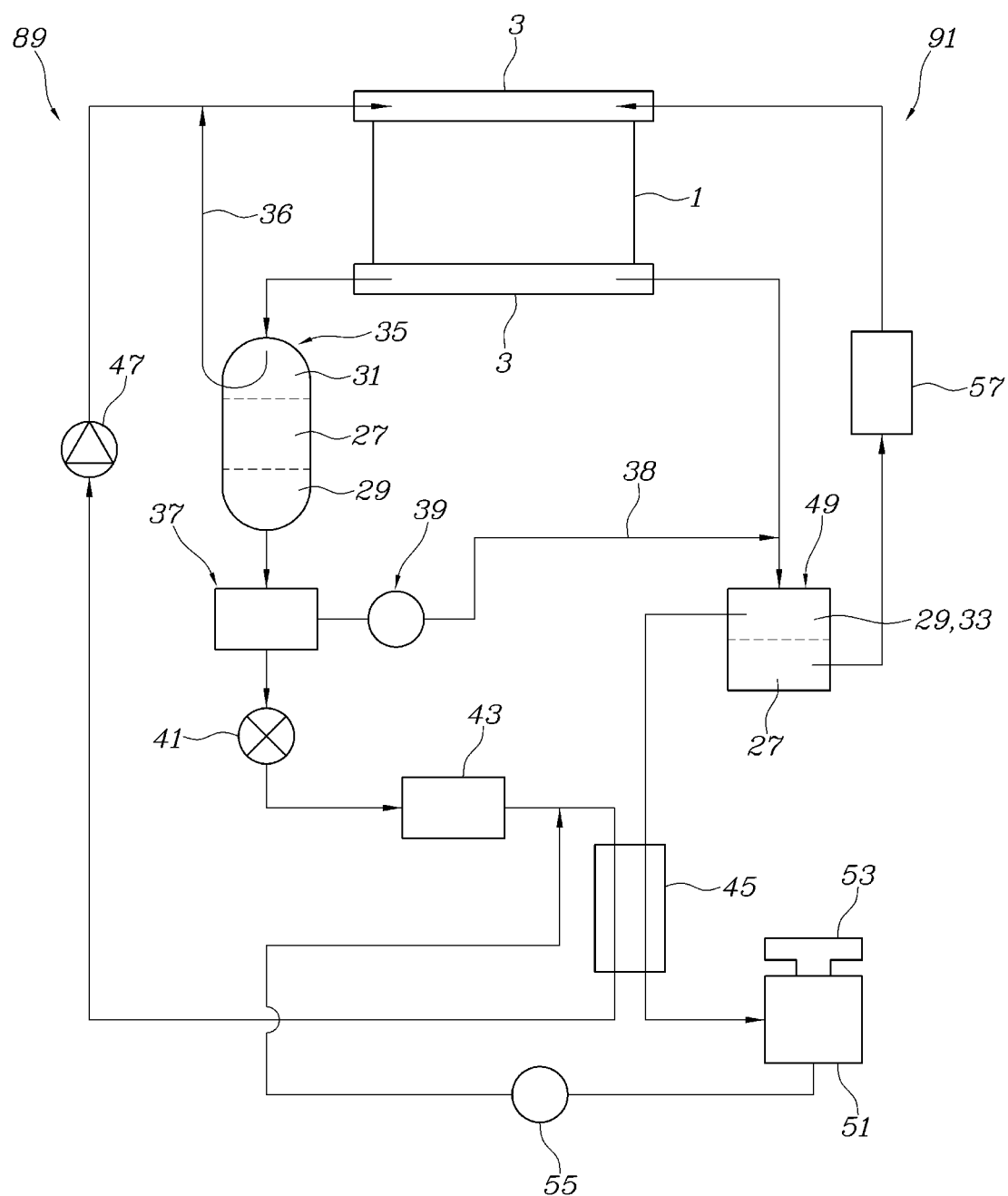
FIG. 4 is a view illustrating a cooling system according to the invention.

As shown in FIG. 4, the air conditioning circuit 89 is provided with a first gas-liquid separator 35, an expansion valve 41, the cooling core 43, and a compressor 47, and the first cooling fluid sequentially circulates through each component and enters an inlet 5 of the tank 3 again. In addition, in the cooling circuit 91, the second cooling fluid also sequentially circulates through the second gas-liquid separation plate 49 and the electric component 57 and then enters an inlet 5 of the tank 3.

That is, fluids flowing into the tank 3 through the cooling circuit 91 and the air conditioning circuit 89 are the refrigerant 29, a gas refrigerant 31, air 33, and the cooling water 27. Then the fluids introduced into the tank 3 are mixed and discharged by a movement of the diaphragm 9.

Taking a look at the flow of the fluids flowing in the air conditioning circuit 89, among the gas refrigerant 31, the refrigerant 29, and the cooling water 27, which are mixed and introduced into the first gas-liquid separator 35 of the air conditioning circuit 89, the gas refrigerant 31 is first separated and discharged through the first space 36 to the inlet 5 of the tank 3. Meanwhile, a cooling water separator 37 is provided to separate the refrigerant 29 and the cooling water 27, which are discharged from the first gas-liquid separator 35, using the difference in specific gravities, and is connected to the cooling circuit 91 so that the separated cooling water 27 is brought back to the cooling circuit 91.

The gas refrigerant 31 here may contain the air 33.

In a first embodiment of the cooling water separator 37 configured to separate the cooling water 27 and the refrigerant 29, because the refrigerant 29 has a specific gravity higher than the cooling water 27 in a liquid state, the cooling water 27 is separated above the refrigerant 29. Therefore, a first cooling water discharge port 65 through which the separated cooling water 27 is discharged is located on a higher side in the gravity direction than a first refrigerant discharge port 63 through which the refrigerant 29 is discharged, whereby each fluid is provided to be discharged to a different discharge port.

In addition, a first valve 39, which may allow or block the flow of the cooling water 27 to the first cooling water discharge port 65 and may prevent the inflow of the refrigerant 29, may be provided between the first cooling water discharge port 65 and the cooling water separator 37.

In a second embodiment of the cooling water separator 37 configured to separate the cooling water 27 and the refrigerant 29, the cooling water separator 37 is provided with a first cooling water discharge port 65, which is connected to a cooling circuit 91 and through which the separated cooling water 27 is discharged, wherein the first cooling water discharge port 65 is located on a higher side in the gravity direction than a first refrigerant discharge port 63, through which the refrigerant 29 is discharged. In addition, the cooling water separator 37 is also provided with a cooling water separation plate 59 therein, thereby allowing the cooling water 27 and the refrigerant 29 to be separated.

That is, the cooling water separation plate 59 is configured to form a relationship having a specific gravity higher than the cooling water but lower than the refrigerant, and a shape of the cooling water separation plate 59 extends in a planar direction from the inside of the cooling water separator 37. In addition, a plurality of through holes 69 is provided to allow a fluid movement between an upper side and a lower side.

In addition, the cooling water separation plate 59 is located to be movable in a vertical direction by the refrigerant 29. In addition, in order not to allow the cooling water 27 to be mixed and discharged when the separated cooling water 27 is discharged to the first cooling water discharge port 65, the cooling water separation plate 59 is configured to include a shape enveloping the inside of the cooling water separator 37. As a result, the first valve 39 of the first embodiment may not be necessary to be provided but may be provided as necessary.

Figure 5:
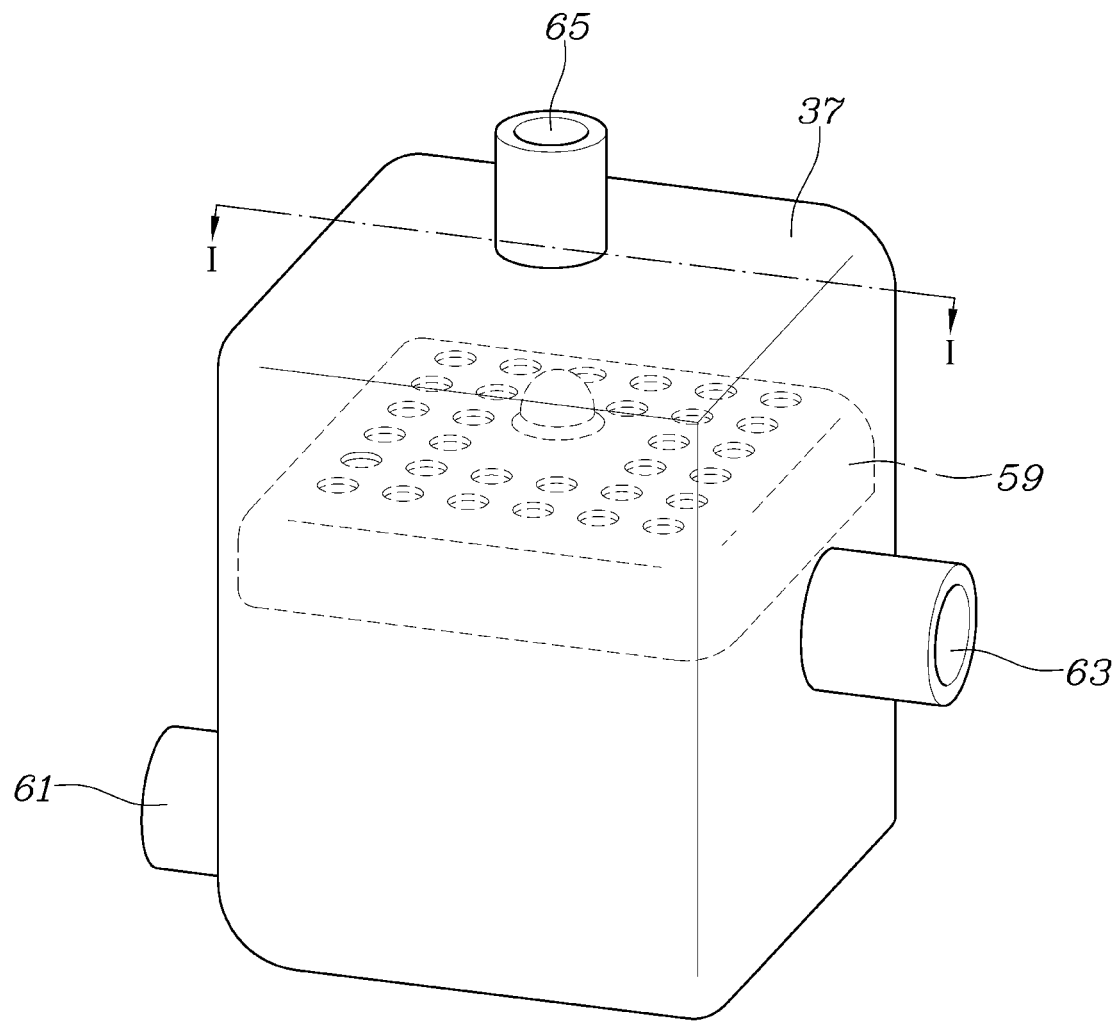
FIG. 5 is a view illustrating a cooling water separator.
Figure 6:
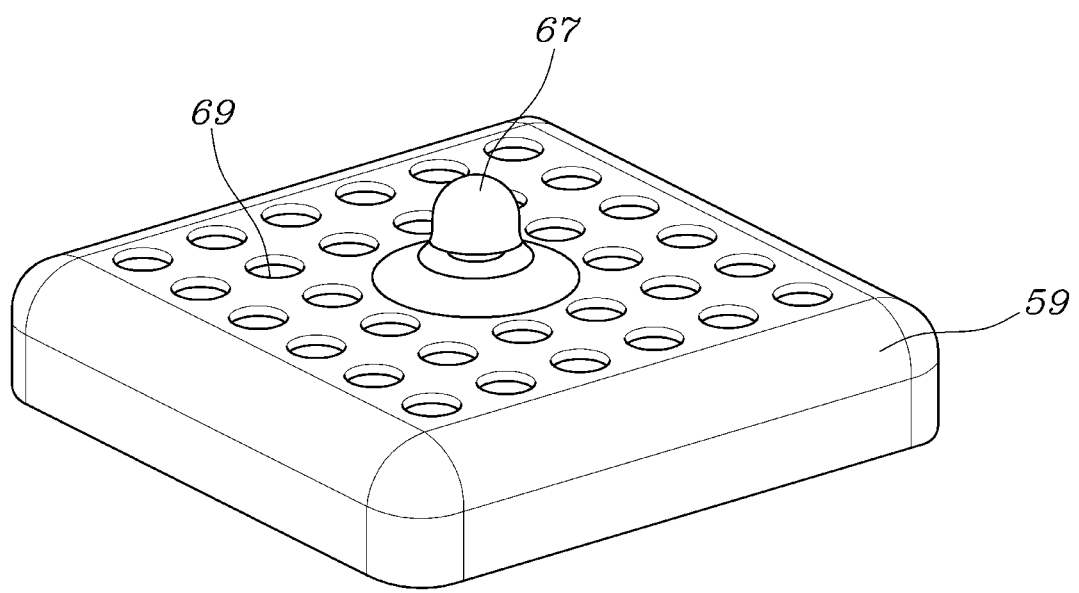
FIG. 6 is a view illustrating a cooling water separation plate.
Figure 7:
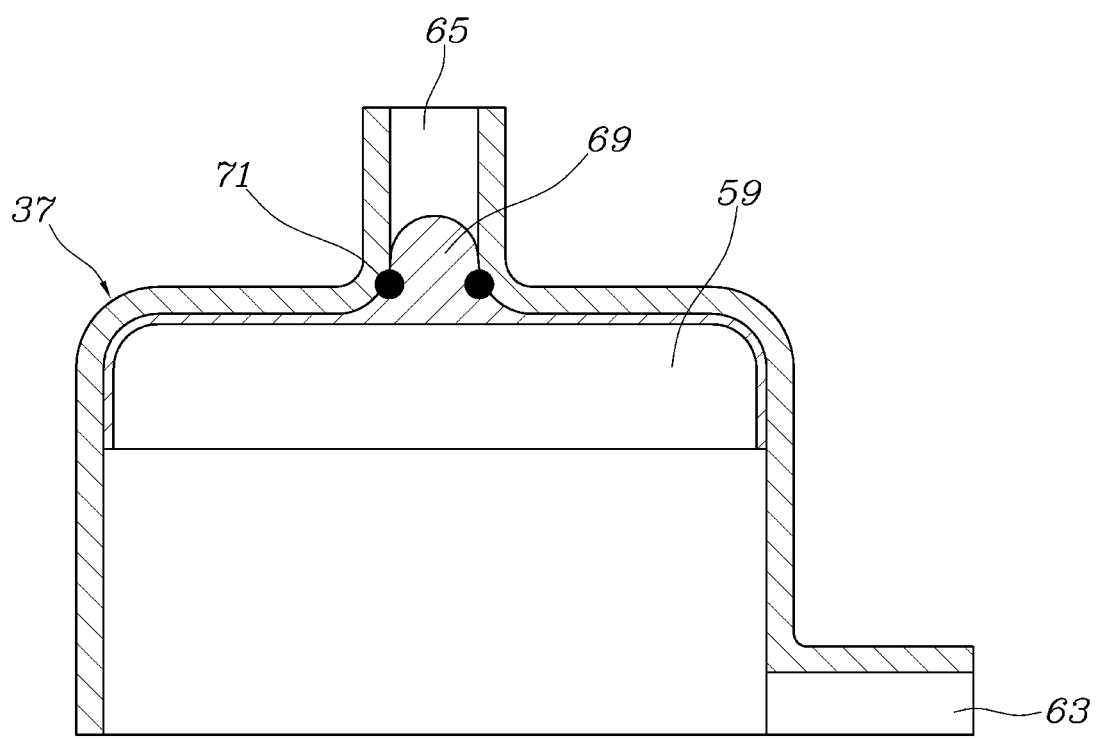
FIG. 7 is a sectional view of FIG. 5.

In a third embodiment of the cooling water separator 37 configured to separate the cooling water 27 and the refrigerant 29, as shown in FIG. 5, the cooling water separator 37 is provided with a first cooling water discharge port 65, which is connected to a cooling circuit 91 and through which the separated cooling water 27 is discharged, wherein the first cooling water discharge port 65 is located on a higher side in the gravity direction than a first refrigerant discharge port 63, through which the refrigerant 29 is discharged. More specifically, the first cooling water discharge port 65 is provided perpendicularly to a top side of the cooling water separator 37 in a direction to be crossed with the first refrigerant discharge port 63.

In addition, the cooling water separator 37 is provided with the same cooling water separation plate 59 as that of the second embodiment therein, wherein the cooling water separation plate 59 is configured to further include a cock 67 to be inserted into the first cooling water discharge port 65 in a state of being maximally raised inside the cooling water separator 37 to block the inflow of the refrigerant 29.

That is, the cock 67 is inserted into the first cooling water discharge port 65 in the state in which the cooling water separation plate 59 is maximally raised inside the cooling water separator 37, thereby blocking the first cooling water discharge port 65. However, in order to prevent a predetermined amount of mixed inflow, a groove is provided in the cock 67, whereby the cock O-ring 71 is coupled with the groove.

Therefore, according to the embodiments of the cooling water separator 37, the location of the first cooling water discharge port 65 and the first refrigerant discharge port 63 and whether the cooling water separation plate 59 is used or not may vary as necessary.

The cooling water separated through the cooling water separator 37 is connected to the discharge port 7 of the tank 3, thereby being connected to the cooling circuit 91, and the separated refrigerant 29 sequentially passes through the expansion valve 41, the cooling core 43 and then flows into the inlet 5 of the tank 3 to make circulation.

Taking a look at the flow of the fluids flowing in the cooling circuit 91, among the gas refrigerant 31, the air 33 and the cooling water 27, which are introduced into the second gas-liquid separation plate 49 through the cooling circuit 91, the cooling water 27 is separated and discharged to the electric component 57, and the gas refrigerant 31 and the air discharged from the second gas-liquid separation plate 49 are converted into the refrigerant 29 in a liquid state by a heat exchanger 45. Meanwhile, a refrigerant separator 51 configured to separate the air 33 and the refrigerant 29 is provided.

In a first embodiment of the refrigerant separator 51 configured to separate the air 33 and the refrigerant 29, the air and the refrigerant 29 in the refrigerant separator 51 are separated such that the air is located above the refrigerant 29 due to the difference in specific gravities. In order to discharge the air, a pressure cap 53 is further provided on a top side of the refrigerant separator 51. Therefore, the air is allowed to be discharged accordingly.

In addition, the refrigerant separator 51 is provided with a second refrigerant discharge port 75 to return the refrigerant 29 to the air conditioning circuit 89, and a second valve 55 configured to allow or block the flow of the refrigerant 29 is provided in the second refrigerant discharge port 75.

The second valve 55 installed in the second cooling water discharge port 75 may be provided as necessary.

In addition, in a second embodiment of the refrigerant separator 51, in a state where the second gas-liquid separation plate 49 is not provided, a refrigerant separator 51, which may separate the gas refrigerant 31, the air 33, and the cooling water 27, is provided, whereby the gas refrigerant 31, the air 33, and the cooling water 27 are allowed to be introduced directly thereinto.

Figure 8:
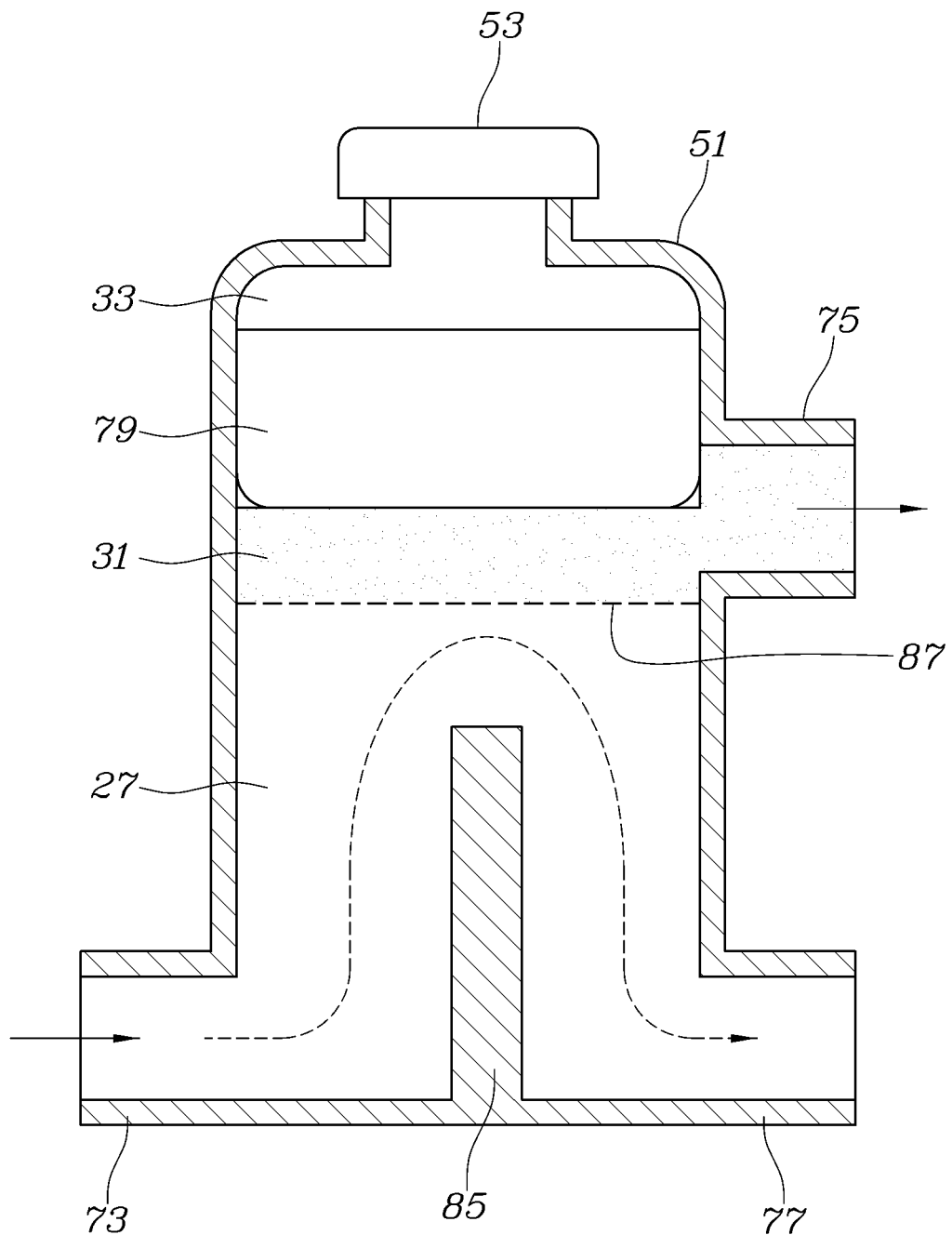
FIG. 8 is a sectional view of a refrigerant separator.

As shown in FIG. 8, a refrigerant separation plate 79 is provided to separate the gas refrigerant 31 and the air 33, which are introduced into the refrigerant separator 51, wherein the refrigerant separation plate 79 is configured to form a relationship having a specific gravity higher than the air but lower than the gas refrigerant, and a shape of the refrigerant separation plate 79 extends in a planar direction from the inside of the refrigerant separator 51. In addition, a plurality of through holes 83 is provided to allow the fluid movement between an upper side and a lower side.

Accordingly, the second refrigerant discharge port 75 is provided to allow the gas refrigerant 31 separated by the refrigerant separator 51 to be discharged therethrough to return to the air conditioning circuit 89, and a second cooling water discharge port 77 is provided to allow the cooling water 27 to be discharged therethrough. At this time, the second refrigerant discharge port 75 is located spaced apart from and on a higher side in the gravity direction than the second cooling water discharge port 77.

In order to secure that the gas refrigerant 31 introduced into the refrigerant separator 51 is not allowed to be mixed with the cooling water 27 or to be introduced into the second cooling water discharge port 77, a flow restriction portion 85 configured to restrict a flow direction of the gas refrigerant 31 to an upper side is provided.

In addition, the refrigerant separation plate 79 is located to be movable in the vertical direction by the gas refrigerant 31 and is configured to include a shape enveloping the inside of the refrigerant separator 51. Accordingly, when the separated gas refrigerant 31 is discharged to the second refrigerant discharge port 75, the refrigerant separation plate 79 prevents the air from being discharged by being mixed with the separated gas refrigerant 31. In addition, when an appropriate amount of the gas refrigerant 31 is discharged, the refrigerant separation plate is lowered and blocks the second refrigerant discharge port 75, thereby preventing the air from being discharged.

In other words, the cooling water 27 inside the refrigerant separator 51 flows inside the refrigerant separator 51 so as to be maintained at a predetermined height 87, which is located below the second refrigerant discharge port 75 in the gravity direction. Subsequently, when the gas refrigerant 31 is completely discharged, the refrigerant separation plate 79 is lowered to locate at the predetermined height 87 and blocks the second refrigerant discharge port 75, thereby preventing the air from flowing in.

Figure 9:
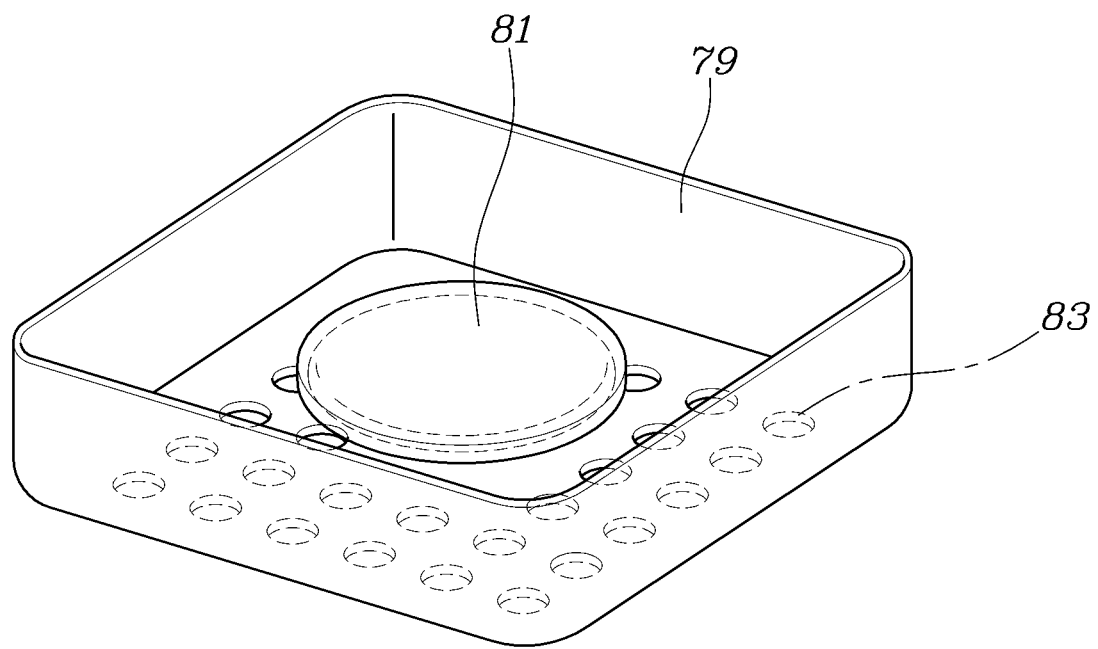
FIG. 9 is a view illustrating a refrigerant separating plate.

With reference to FIG. 9, the refrigerant separation plate 79 provided between the air 33 and the gas refrigerant 31 may further include a gas injection unit 81 having a gas stored therein to balance specific gravity, thereby being coupled with the inside of the refrigerant separator 51.

In addition, in order to discharge the air 33 separated by the refrigerant separation plate 79, the pressure cap 53 is further provided on the top side of the refrigerant separator 51. Therefore the air 33 may be discharged accordingly.

Therefore, the cooling water 27 separated by the refrigerant separator 51 of the second embodiment is connected to the inlet 5 of the tank 3 through the electric component 57, and as described above, the separated gas refrigerant 31 is discharged by being connected between the cooling core 43 and the compressor 47, thereby returning to the air conditioning circuit 89.

Figure 10:
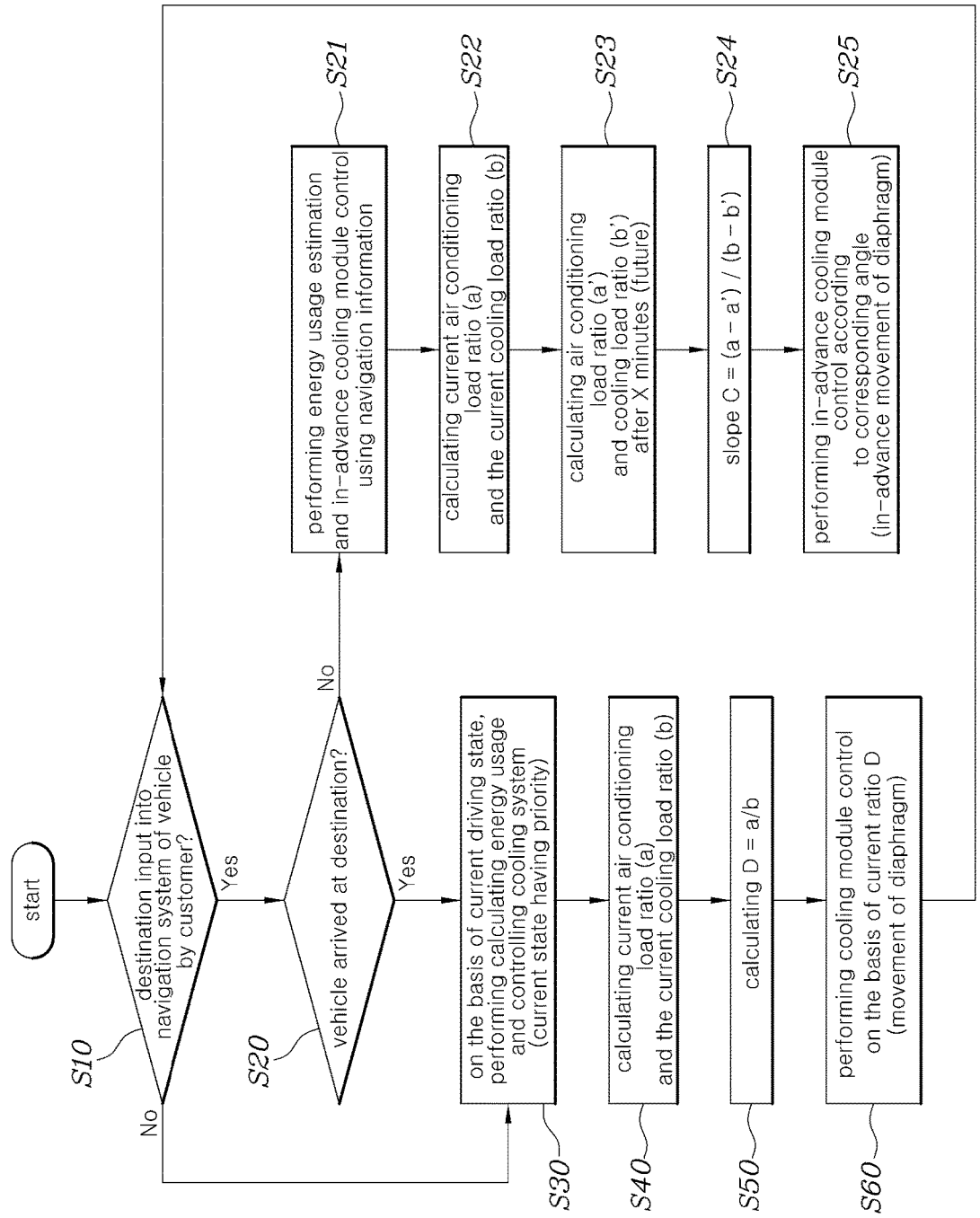
FIG. 10 is a flowchart illustrating a method of operating the cooling system according to the present invention.
Figure 11:
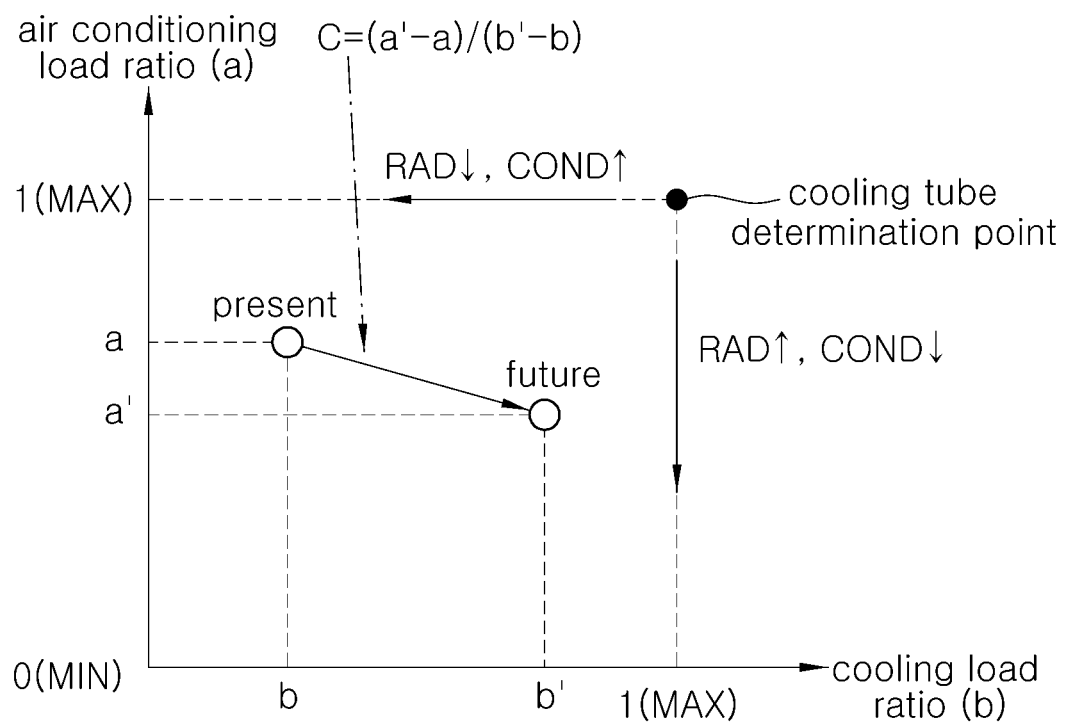
FIG. 11 is a graph illustrating a ratio of an air conditioning load and a cooling load.
Figure 12:
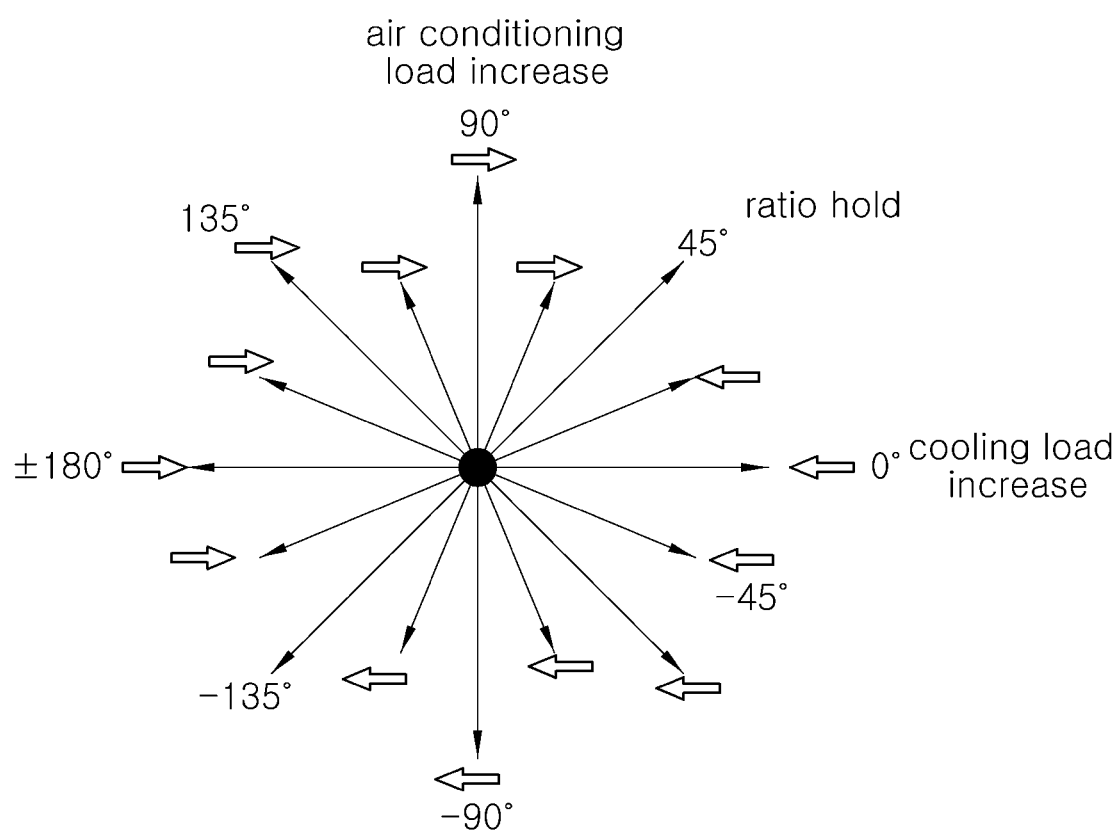
FIG. 12 is a graph illustrating an air conditioning system adjustment according to a slope of FIG. 11.

There is provided a control method of the cooling system of the present invention, with reference to FIGS. 10 to 12, the method including: calculating a current air conditioning load of the air conditioning circuit 89 and a current cooling load of the cooling circuit 91 at step S40 on the basis of a current driving state; calculating a ratio between the calculated current air conditioning load and current cooling load at step S50; and controlling the movement of the diaphragm 9 at step S60 on the basis of the calculated ratio between the current air conditioning load and the current cooling load.

That is, the ratio of the cooling load and the air conditioning load is calculated, whereby each load having priority is controlled by varying the diaphragm by a circuit connected to the actuator 11.

Therefore, before the controlling the movement of the diaphragm 9 at step S60, on the basis of an estimated driving state after a preset time or a preset distance using navigation information, the control method further includes: calculating an estimated air conditioning load of the air conditioning circuit 89 and an estimated cooling load of the cooling circuit 91 at step S23; and calculating a ratio between the calculated expected air conditioning load and expected cooling load at step S24.

That is, when a destination is not input into a navigation system by a customer during a driving, on the basis of a current driving state, the performing calculating energy usage and controlling a cooling system (S30) are initiated. Because the current driving state has the priority at this time, calculating the current air conditioning load ratio (a) and the current cooling load ratio (b) (S40) is performed, whereby a ratio D of the condenser and the radiator is determined (S50) on the basis of each current ratio.

Therefore, by performing a cooling system control on the basis of the current ratio D (S60), when the air conditioning load is increased, the number of the cooling tubes, through which the refrigerant flows, is increased to perform the air conditioning by priority. Similarly, when the cooling load is increased, the number of the cooling tubes, through which the cooling water flows, is increased to perform the cooling by priority.

When the vehicle is being driven, it is difficult to respond immediately because of the stabilization speed of the cooling system. In order to complement this, the destination is input into the navigation system of the vehicle (S10), whereby an energy usage estimation and a cooling system in-advance control may be performed using the navigation information (S21).

In other words, before arriving at the destination (S20), an estimated air conditioning load (a') and an estimated cooling load (b') for several minutes later are calculated (S23), whereby a slope C of the coordinate may be found through a proportional relationship (S24) with the calculated current air conditioning load ratio (a) and current cooling load ratio (b) (S22).

As shown in FIG. 12, the future after several minutes from the current basis may be predicted with respect to 360 angle degrees according to angles of the slopes C. Subsequently, one control method having priority corresponding to the predicted future is determined from methods of the cooling and the air conditioning, which may have respective priority or equal priority, and a cooling system in-advance control is performed according to a corresponding angle (S25).

Therefore, the customer may be allowed to predict the future state, thereby allowing the energy usage of the air conditioning load and the cooling load to be predicted.

In addition, in order for the customer to understand the selected movement route of the navigation system, the air conditioning load and the cooling load of several minutes from present are calculated by prediction by using the factors of each cell such as the slope of the road, the outside temperature, the expected vehicle speed, the maximum possible driving speed, the traffic volume, the speed limit, and the like. Therefore, the diaphragm 9 is varied accordingly by determining each ratio in advance taking system stability into consideration.

In addition, when an unexpected sudden situation occurs, the prediction calculation is terminated. When the prediction is different from the current status, the prediction is corrected by the current status, that is, using considering factors of each cell such as the target temperature, current room temperature, current passengers on board, vehicle weight, fuel level, amount of accelerator pedal opening, and the like.

The air conditioning load here is calculated by sensing the number of people and an amount of solar radiation, outside air temperature and indoor target temperature, and the like, and the cooling load is calculated by sensing the vehicle speed and an amount of accelerator pedal opening, grade of ascending, outside air temperature, and the like.

In the controlling of varying the diaphragm 9 of the present invention to determine the number of cooling tubes, the control method of the cooling system is composed of controlling the movement of the diaphragm 9 on the basis of the ratio D and the change C of the ratio, wherein the ratio D is for the calculated current air conditioning load and the current cooling load, and the change C of the ratio is for the calculated estimated air conditioning load and the estimated cooling load.

Therefore, by predicting an amount of future energy usage and responding in advance using destination information of the navigation system of the vehicle, it is possible to maximize efficiency by contributing to maintaining the optimal state of the vehicle and improving fuel efficiency and energy efficiency.

While shown and described in connection with specific embodiments of the present invention, it will be self-evident for those of ordinary knowledge within the skill of the art that various changes and modifications may be made therein without departing from the spirit of the invention provided by the following claims.

What is claimed is:
1. A cooling system comprising:
a plurality of cooling tubes arranged in parallel, wherein a first cooling fluid and a second cooling fluid can flow in the cooling tubes;
a tank communicating with the plurality of cooling tubes to allow the first cooling fluid or the second cooling fluid to flow through the plurality of cooling tubes;
a diaphragm located inside the tank to separate the tank into a first space allowing the first cooling fluid to flow therein and a second space allowing the second cooling fluid to flow therein, the diaphragm coupled to the tank to be rectilinearly movable in a direction of an arrangement of the plurality of cooling tubes;
an air conditioning circuit that uses a refrigerant as the first cooling fluid connected to the first space to allow the first cooling fluid to flow therein, the air conditioning circuit provided with a cooling core for indoor air conditioning;
a cooling circuit that uses cooling water as the second cooling fluid connected to the second space to allow the second cooling fluid to flow therein, the cooling circuit connected to an electrical component so as to allow the second cooling fluid to exchange heat with the electrical component; and
a cooling water separator provided in the air conditioning circuit and configured to separate the cooling water from a fluid discharged from the tank using a difference in specific gravity, the cooling water separator being connected to the cooling circuit to allow the separated cooling water to return to the cooling circuit.

2. The system of claim 1, further comprising a first gas-liquid separator provided in the air conditioning circuit and configured to separate gas from a fluid discharged from the tank, wherein the gas separated in the first gas-liquid separator can be flowed again into the first space.

3. The system of claim 1, further comprising a second gas-liquid separator in the cooling circuit and configured to separate gas from a fluid discharged from the tank.

4. The system of claim 3, further comprising a refrigerant separator configured to separate the refrigerant in a liquid state using a difference in specific gravity in a state where the gas discharged from the second gas-liquid separator is cooled, the refrigerant separator being connected to the air conditioning circuit to allow the separated refrigerant to return to the air conditioning circuit.

5. The system of claim 1, further comprising:
a refrigerant separator in the air conditioning circuit and configured to separate the refrigerant from a fluid discharged from the tank using a difference in specific gravity, the refrigerant separator being connected to the air conditioning circuit to allow the separated refrigerant to return to the air conditioning circuit, wherein the refrigerant in a gas state has a lower specific gravity than the cooling water and has a higher specific gravity than air;
a second refrigerant discharge port connected to the air conditioning circuit and through which the refrigerant is discharged, the second refrigerant discharge port being located in the refrigerant separator at a higher side in a gravity direction than a second cooling water discharge port through which the cooling water is discharged; and
a refrigerant separation plate extending in a planar direction from an inside of the refrigerant separator, located to be movable in a vertical direction, having a lower specific gravity than the refrigerant in a gas state, having a higher specific gravity than air, and provided with through holes allowing a fluid movement between upper and lower sides.

6. The system of claim 5,
wherein the cooling water can flow inside the refrigerant separator so as to be maintained at a predetermined height which is located on a lower side in the gravity direction than the second refrigerant discharge port, and
wherein the refrigerant separation plate is configured to block the second refrigerant discharge port at a predetermined height.

7. The system of claim 5, further comprising a gas injection unit having gas stored therein provided on the refrigerant separation plate.

8. The system of claim 5, further comprising a flow restriction portion configured to restrict a flow direction of the fluid discharged from the tank provided inside the refrigerant separator.

9. A method of controlling a cooling system,
wherein the cooling system comprises:
a plurality of cooling tubes arranged in parallel, wherein a first cooling fluid and a second cooling fluid can flow in the cooling tubes;
a tank communicating with the plurality of cooling tubes to allow the first cooling fluid or the second cooling fluid to flow through the plurality of cooling tubes;
a diaphragm located inside the tank to separate the tank into a first space allowing the first cooling fluid to flow therein and a second space allowing the second cooling fluid to flow therein, the diaphragm coupled to the tank to be rectilinearly movable in a direction of an arrangement of the plurality of cooling tubes;
an air conditioning circuit that uses a refrigerant as the first cooling fluid connected to the first space to allow the first cooling fluid to flow therein, the air conditioning circuit provided with a cooling core for indoor air conditioning;
a cooling circuit that uses cooling water as the second cooling fluid connected to the second space to allow the second cooling fluid to flow therein, the cooling circuit connected to an electrical component so as to allow the second cooling fluid to exchange heat with the electrical component; and
a cooling water separator provided in the air conditioning circuit and configured to separate the cooling water from a fluid discharged from the tank using a difference in specific gravity, the cooling water separator being connected to the cooling circuit to allow the separated cooling water to return to the cooling circuit, and
wherein the method comprises:
calculating a current air conditioning load of the air conditioning circuit and a current cooling load of the cooling circuit on basis of a current driving state;
calculating a ratio between the calculated current air conditioning load and the calculated current cooling load; and
controlling a movement of the diaphragm on the basis of the calculated ratio between the current air conditioning load and the current cooling load.

10. The method of claim 9, further comprising:
calculating a predicted air conditioning load of the air conditioning circuit and a predicted cooling load of the cooling circuit, before the controlling the movement of the diaphragm, on the basis of a predicted driving state after a preset time or a preset distance using navigation information;
calculating a ratio between the calculated predicted air conditioning load and the calculated predicted cooling load; and
controlling the movement of the diaphragm, in the controlling the movement of the diaphragm, on the basis of the ratio between the calculated current air conditioning load and the calculated current cooling load and a change in the ratio between the calculated predicted air conditioning load and the calculated predicted cooling load.

11. The method of claim 9,
wherein the refrigerant has a higher specific gravity than the cooling water in a liquid state,
wherein a first cooling water discharge port is connected to the cooling circuit and through which the separated cooling water is discharged, the first cooling water discharge port located in the cooling water separator at a higher side in a gravity direction than a first refrigerant discharge port through which the refrigerant is discharged; and
wherein a first valve is provided in the first cooling water discharge port to allow or block a flow of the cooling water.

12. The method of claim 9,
wherein the refrigerant has a higher specific gravity than the cooling water in a liquid state, wherein a first cooling water discharge port is connected to the cooling circuit and through which the separated cooling water is discharged, wherein the first cooling water discharge port is located in the cooling water separator at a higher side in a gravity direction than a first refrigerant discharge port through which the refrigerant is discharged; and wherein a cooling water separation plate that which extends in a planar direction from an inside of the cooling water separator, is located to be movable in a vertical direction, has a lower specific gravity than the refrigerant in a liquid state, has a higher specific gravity than the cooling water, and is provided with through holes allowing a fluid movement between upper and lower sides.

13. The method of claim 12, wherein the cooling water separation plate is configured to block the first cooling water discharge port in a state of being maximally raised inside the cooling water separator.

\* \* \* \* \*